United States Patent [19]

Toms

[11] Patent Number: 5,077,619
[45] Date of Patent: Dec. 31, 1991

[54] HIGH LINEARITY OPTICAL TRANSMITTER

[75] Inventor: Dennis J. Toms, Carlsbad, Calif.
[73] Assignee: Tacan Corporation, Carlsbad, Calif.
[21] Appl. No.: 427,178
[22] Filed: Oct. 25, 1989
[51] Int. Cl.$^5$ .......................................... H04B 10/00
[52] U.S. Cl. .................................................. 359/187
[58] Field of Search ............... 455/617, 618, 613, 609; 372/29, 31, 33

[56] References Cited

U.S. PATENT DOCUMENTS

| 4,149,071 | 4/1979 | Nagai et al. | 455/618 |
|---|---|---|---|
| 4,501,022 | 2/1985 | Oswald | 455/618 |
| 4,625,105 | 11/1986 | Hentschel et al. | 455/618 |
| 4,700,352 | 10/1987 | Shikada et al. | 455/609 |
| 4,893,300 | 1/1990 | Carlin et al. | 455/617 |

FOREIGN PATENT DOCUMENTS

| 0021705 | 2/1977 | Japan | 455/618 |
|---|---|---|---|
| 0037405 | 3/1979 | Japan | 455/613 |
| 0130233 | 7/1985 | Japan | 455/618 |

OTHER PUBLICATIONS

Szu, SPIE: *Real Time Signal Processing IX*, 698, 59-65 (1986).
Gelfand et al., *J. Optimiz Theory and Applns.* 62, 1, 49-62 (Jul. 1989).
Kirkpatrick et al., *Science*, 220, 4598, 671-680 (May 13, 1983).
Suz, "Fast Simulated Annealing" in Denker (ed.), AIP Conf. Proc. 151: *Neural Networks for Computing*, 420-425 (1986).
*IEEE Journal of Solid State Circuits*, vol. SC-13, No. 1, Feb. 1978, pp. 133-137.
*Electrnics Letters*, 13, 158 (1977).
*Electronics Letters*, vol. 13, No. 6, Mar. 17, 1977, pp. 162-163.
Szu, in AIP Conference Proceedings 151, Neural Networks for Computing, Snowbird Utah (1986).
Ueno et al, "Optical Fiber Communications for Broadcasting Applications", Conference: Intelcon 79 Exposition Proceedings, Dallas, Tex., pp. 172-176.

*Primary Examiner*—Reinhard J. Eisenzopf
*Assistant Examiner*—L. Pascel
*Attorney, Agent, or Firm*—Brown, Martin, Haller & McClain

[57] ABSTRACT

An optical transmitter, appropriate for transmitting analog signals in fiber optic systems, having an adjustable distortion device which distorts the input to a light emitter device so as to linearize the overall input-to-output response of the optical transmitter. The optical transmitter further has a feedback circuit optically coupled at its input to the output of the light emitter device and electrically coupled at a plurality of its outputs to a corresponding plurality of inputs of the adjustable distortion device, for altering the degree and kind of distortion in response to the output of the light emitter device in order to adaptively compensating the nonlinearities of the overall system.

9 Claims, 3 Drawing Sheets

HIGH LINEARITY OPTICAL TRANSMITTER

FIELD OF THE INVENTION

The present invention relates to optical transmitters. More specifically, the present invention relates to optical transmitters which are particularly suited to the transmission of analog signals in fiber optic systems.

BACKGROUND OF THE INVENTION

Analog optical transmission has recently attracted renewed interest owing to the inherently low-noise characteristics of fiber optic systems. With the advent of single mode systems noise levels have been greatly reduced by eliminating modal noise within the fiber. Also, recent improvements in laser diodes have led to dramatically lower noise levels. With these advances in fiber optic technology, analog transmission becomes extremely attractive in applications where the desired signals at the terminal ends are analog (for example, commercial television). By eliminating the need for modulation conversion the terminal equipment is greatly reduced in complexity and cost.

One remaining obstacle to widespread use of analog optical transmission is the intrinsic nonlinearity of typical light emitting devices. Distortion of the signal caused by nonlinearities can be a problem, particularly in multichannel systems, where a high degree of linearity is required to prevent interchannel crosstalk.

Linearization of a laser diode or high bandwidth light emitting diode (LED) by direct feedback is generally not feasible due to the difficulty of controlling phase shift at the extremely high frequencies involved. However, other methods of linearization are possible. For example, a quasi-feed-forward technique by Straus and Szentesi, *Electronics Letters,* 13, 158 (1977), effectively linearized an LED by using a matched LED to cancel the distortion. Linearization of an LED by predistorting the input signal was reported by Asatani and Kimura, *Electronics Letters,* 13, 162 (1977) and *IEEE Journal of Solid-State Circuits,* SC-13, 133 (1978). Their method, using fixed predistortion, gave second and third harmonic distortion improvement of 28 dB and 31 dB respectively.

SUMMARY OF THE INVENTION

The present invention utilizes a novel method of indirect (averaged) feedback to adaptively predistort the input so as to minimize the overall nonlinear distortions Since the predistortion is adaptive and continuously acting, optimum linearity is automatically maintained as operating conditions change.

Broadly stated, the present invention provides an optical transmitter capable of adaptively maintaining linear input-to-output response, comprising adjustable distortion means having a plurality of inputs and an output, adapted to receive an input signal at its first input and a plurality of control voltages at additional inputs and to vary its input-to-output system response in response to variation in said control voltages to distort said input signal and provide a resultant predistorted signal at its output; light emitter means having an input and an output, said input electrically coupled to the output of said adjustable distortion means for receiving said predistorted signal and generating an optical transmission signal through said output, whose intensity varies in response to the variation of said predistorted signal; and feedback means having an input and a plurality of outputs, optically coupled at its input to the output of said light emitter means and electrically coupled at said plurality of outputs to said plurality of inputs of said adjustable distortion means corresponding to said plurality of feedback means outputs, for receiving said optical transmission signal and for providing said adjustable distortion means with said plurality of control voltages which are capable of varying in response to said optical transmission signal, thereby predistorting said input signal so as to adaptively linearize the overall input-to-output response of said optical transmitter.

Further, the present invention provides a method for adaptively linearizing the response of an optical transmitter comprising the steps of generating an optical transmission signal corresponding to an electrical input signal; generating at least one time averaged signal, in response to said optical transmission signal, whose magnitude is indicative of the nonlinearity of the input-to-output response of said optical transmitter; and altering the input-to-output response of said optical transmitter so as to minimize the magnitude of said time averaged signal, thereby adaptively linearizing the overall input-to-output response of the optical transmitter.

Additionally, the present invention provides a method for adaptively linearizing the response of an optical transmitter comprising the steps of generating a predistorted input signal by distorting an input signal; generating an optical transmission signal whose intensity varies in response to variations in said predistorted input signal; generating at least one time averaged signal whose magnitude is indicative of the nonlinearity between said input signal and said optical transmission signal; and altering the degree and the kind of distortion of said input signal in response to said time averaged signal so as to minimize the magnitude of said time averaged signal, thereby adaptively linearizing the overall input-to-output response of the optical transmitter.

In one embodiment of the invention the time-averaged feedback signal is derived from spurious harmonic frequencies generated as a result of uncompensated nonlinearities. In this version the feedback means acts to suppress the unwanted harmonics, thereby automatically enhancing the system linearity.

In another embodiment of the invention the time-averaged feedback signal is derived from a comparison of the output signal with the time-delayed input signal. In this version the feedback means acts to reduce the time-averaged discrepancy between the actual output and the desired output.

The present invention provides an optical transmitter having input-to-output linearity substantially superior to that of the transmitters of the prior art. It also provides an optical transmitter having the novel feature of automatically maintaining its high degree of linearity over 18 long periods of time under changing conditions.

Areas of application of the present invention are very broad, encompassing those applications where optical analog transmission is desired. Of particular interest is multichannel video transmission with either AM or FM modulation. The invention might also be used effectively for digital data transmission in local area networks. In this application the digital information would be encoded by modulating an RF carrier, allowing simultaneous operation of multiple data channels with each channel using a different carrier frequency.

DETAILED DESCRIPTION OF THE PREFERRED EMBODIMENTS

The invention and its various aspects will be best understood by reference to the Figures and the following text.

Figure 1:
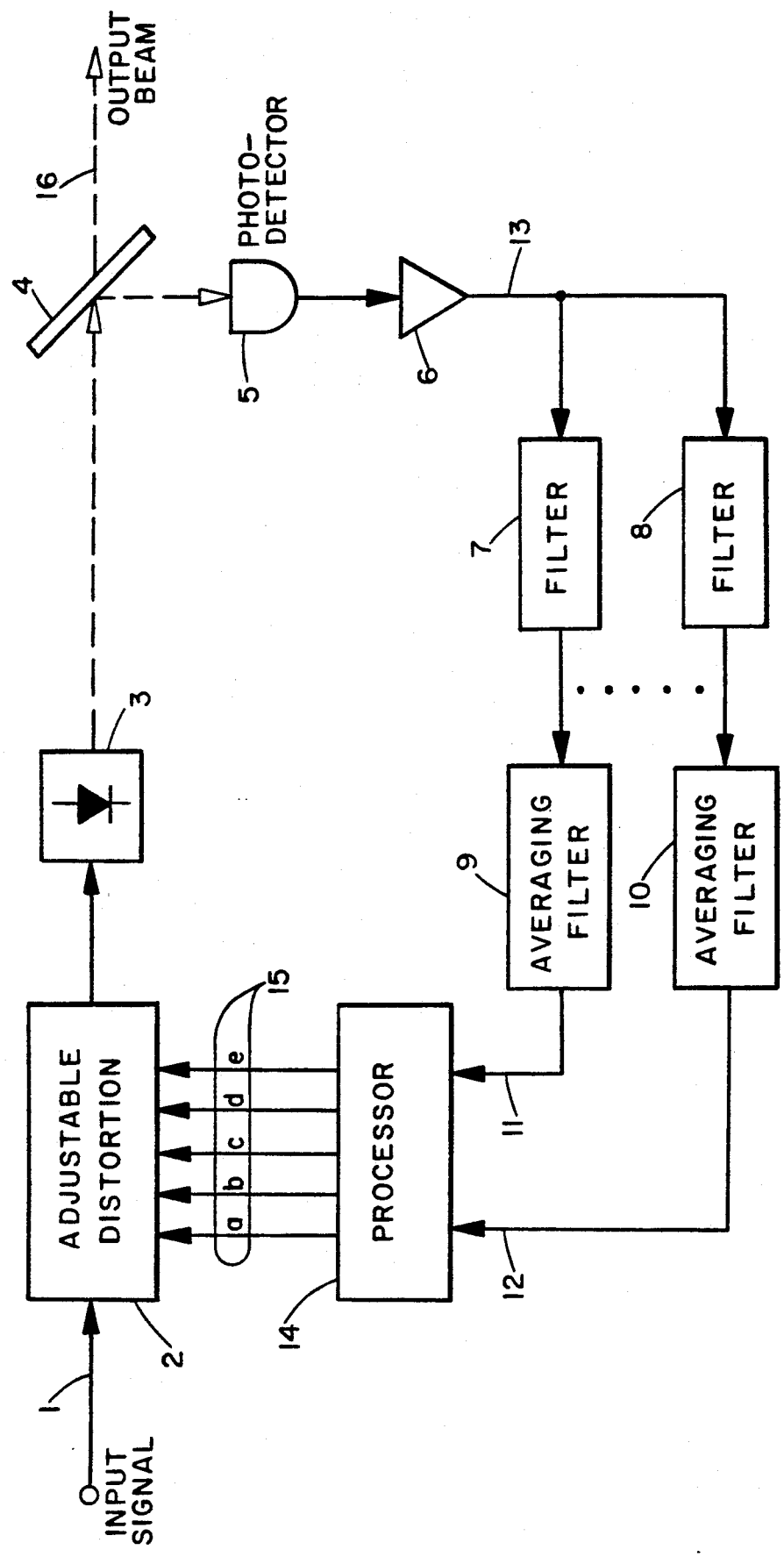
FIG. 1 is a block schematic diagram illustrating the essential features of a first embodiment of the optical transmitter of the present invention wherein linearization is accomplished by the suppression of harmonics.

FIG. 1 is a block diagram schematically illustrating the essential features of one embodiment of the optical transmitter of the present invention. An input signal is applied to input line 1 of the optical transmitter. The input signal may take a variety of forms but in this embodiment it should contain at least one carrier frequency or tone so that any uncompensated nonlinearities will result in spurious harmonic frequencies. For example, the input signal may consist of one or more modulated carriers with the modulation being any of several types including amplitude modulation, frequency modulation, or phase modulation. Alternatively, the input signal may contain a steady tone superimposed on an information carrying signal of arbitrary form.

The first input of adjustable distortion unit 2 is coupled to input line 1, and receives the input signal therefrom. Adjustable distortion unit 2 is for distorting the input signal in a manner which is as close as possible to the exact inverse of the distortion which will occur later in light emitting device 3. Adjustable distortion unit 2 is further coupled at a plurality of other inputs to a corresponding plurality of outputs of processor 14. In response to voltage levels provided on lines 15a–15e by processor 14, adjustable distortion unit 2 is capable of altering its output variation as a function of its input.

The input of light emitting device 3 is coupled to the output of adjustable distortion unit 2, and receives the predistorted input signal therefrom. Light emitting device 3 is for generating an optical transmission signal. Light emitting device 3 responds to the variations in the predistorted input signal by correspondingly varying the intensity of the optical transmission signal. Light emitting device 3 may be any device capable of such operation, including a light emitting diode or a laser diode.

The remaining components shown in FIG. 1 comprise one configuration of the novel feedback means of the present invention. Light splitting device 4 is optically coupled to the output of light emitting device 3. Light splitting device 4 is for splitting off a portion of the optical transmission signal. The split portion of the signal is provided to the other elements feedback means, while the remainder of the optical transmission signal is output from the transmitter as output beam 16.

The input of photodetector 5 is optically coupled to light splitting device 4 and receives the split portion of the optical transmission signal therefrom. Photodetector 5 is for converting the split portion of the signal to an electrical feedback signal. Photodetector 5 responds to variations in the optical signal by correspondingly varying the generated feedback current which is converted into a voltage variation by amplifier 6. (It is well known in the art that photo-detectors cause a current increase proportional to light intensity.)

The input of amplifier 6 is coupled to the output of photodetector 5 and receives the feedback signal therefrom. Amplifier 6 is for increasing the power of the feedback signal and for providing the amplified feedback signal onto line 13.

The inputs of filters 7 and 8 are coupled to the output of amplifier 6, and each receive the amplified feedback signal therefrom. Filters 7 and 8 represent a plurality of narrow band frequency filters which are tuned to a harmonic frequency of one or more of the carrier frequencies of the input signal on line 1. For example, filters 7 and 8 may be tuned to the second and third harmonics, respectively, of one of the carriers. Alternatively, if two or more carrier frequencies are present, filters 7 and 8 may be tuned to beat frequencies (sum or difference frequencies) of those carrier frequencies present. The number of filters is not restricted to two; a larger number may be desirable for multi-carrier signals, while just one filter may be sufficient in some cases. Filters 7 and 8 are for isolating the energies in the feedback signal which are in a very narrow frequency neighborhood around the frequencies to which they are tuned.

The inputs of averaging filters 9 and 10 are coupled to the outputs of filters 7 and 8, respectively, and receive the isolated frequencies of the feedback signal therefrom. Averaging filters 9 and 10 represent a plurality of averaging filters which may be coupled to the outputs of corresponding narrow band frequency filters such as filters 7 and 8. Averaging filters 9 and 10 are for averaging, over some period of time, the energies of the isolated frequency signals they each receive, and for providing voltage levels on lines 11 and 12, respectively, which are indicative of the harmonic or beat content of the signal on line 13.

A first and a second input of processor 14 are coupled to lines 11 and 12, respectively. Processor 14 is for varying the voltages on lines 15a–15e so as to adjust the degree and kind of distortion produced by distortion unit 2. Lines 15a–15e represent a plurality of lines coupling outputs of processor 14 to corresponding inputs of adjustable distortion unit 2.

Processor 14 is normally in continuous operation and responsive to the signals on lines 11 and 12, seeking constantly to adjust the voltage levels on lines 15a–15e so as to minimize the voltage levels on lines 11 and 12. In this way the feedback adjusts the system so as to suppress those harmonic frequencies passed by filters 7 and 8. Suppressing these harmonics has the affect of linearizing the response of the optical transmitter since these harmonics are generated as a result of nonlinearities in the system. The result is that the output signal produced on output beam 16 is a faithful reproduction of the input signal on line 1.

Figure 2:
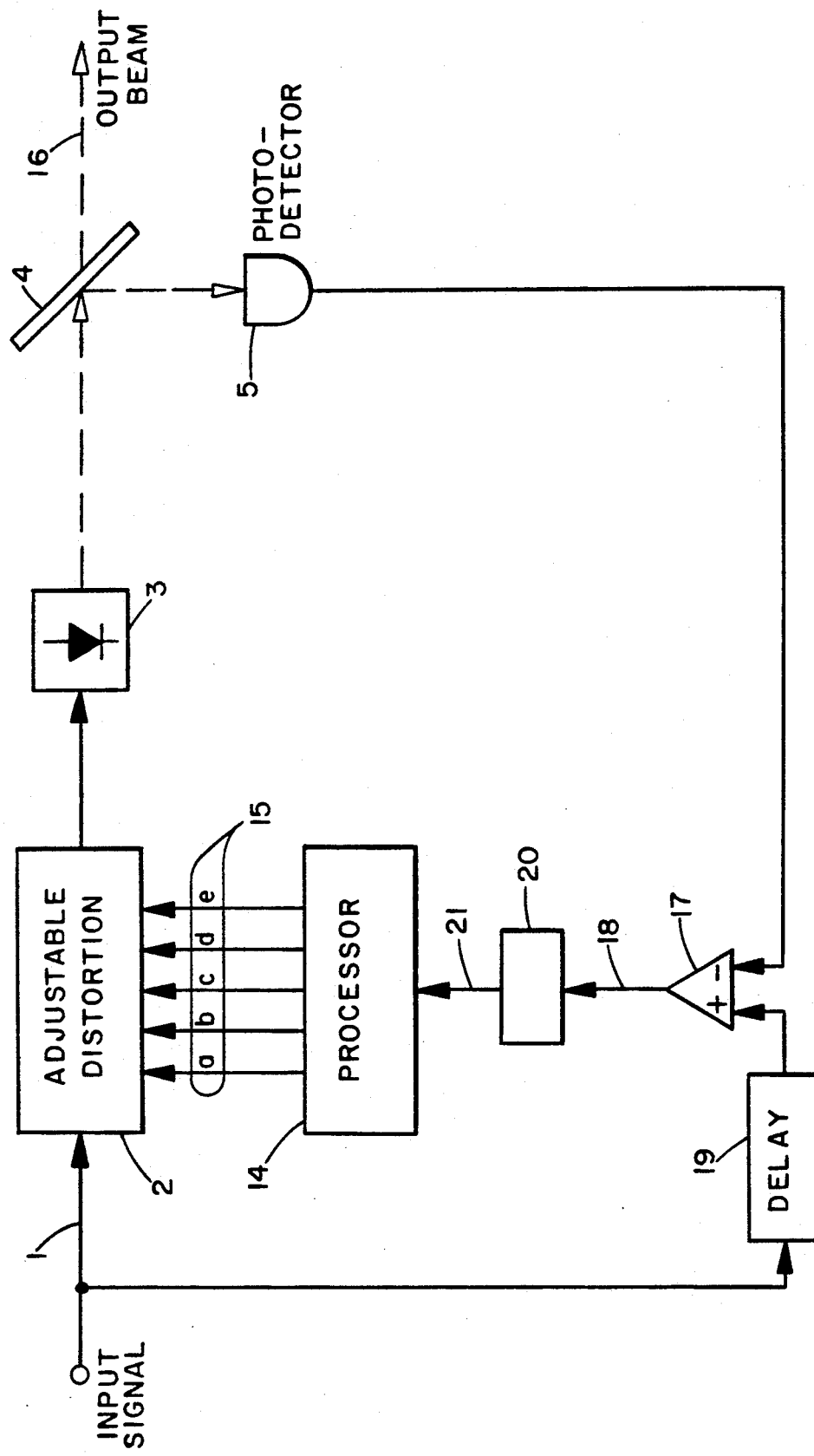
FIG. 2 is a block schematic diagram showing the essential features of a second embodiment of the invention wherein linearization is accomplished by minimizing a time-averaged error signal.

FIG. 2 schematically illustrates an alternate embodiment of the present invention in which the time averaged feedback is derived from a comparison of the output optical transmission signal with a time delayed input signal rather than the harmonic content of the optical transmission signal.

In this embodiment adjustable distortion unit 2, light emitting device 3, light splitting device 4 and photodetector 5 function as described in the previously discussed embodiment.

The input of delay unit 19 is coupled to input line 1 and receives the input signal therefrom. Delay unit 19 is for delaying the input signal on line 1 by a fixed time which is chosen to closely match the total of the delay time of adjustable distortion unit 2, the delay time of light emitting device 3, the optical transmit time to photodetector 5 and the delay time of photodetector 5. Delay unit 19 may be any device capable of such operation, including a co-axial line of fixed length.

Differential amplifier 17 has a first input coupled to the output of delay unit 19 and a second input coupled to the output of photodetector 5. Differential amplifier 17 is for generating an error signal whose magnitude is indicative of the discrepancy between the signals produced by photodetector 5 and the input signal, and for providing the error signal on line 18.

The input of averaging filter 20 is coupled to line 18 and received the error signal therefrom. Averaging filter 20 is for generating a voltage level indicative of the magnitude of the error signal averaged over some time, and for providing the voltage level onto line 21.

Processor 14 functions much the same as described in the previous discussed embodiment. The input of processor 14 is coupled to line 21. Processor 14 is for varying the voltage on lines 15a–15e so as to adjust the kind of degree and distortion by distortion unit 2. Lines 15a–15e represent a plurality of lines coupling outputs of processor 14 to corresponding inputs of adjustable distortion unit 2.

Processor 14 is normally in continuous operation and responsive to the signal on line 21, seeking constantly to adjust the voltage levels on lines 15a–15e so as to minimize the voltage level on line 21. In this way the feedback adjusts the system so as to minimize the discrepancy between the signal produced by photodetector 5 and the input signal, thereby having the effect of linearizing the response of the optical transmitter. The result is that the output signal produced on output beam 16 is a faithful reproduction of the input signal on line 1.

The embodiment of FIG. 2 obviates the need for the input signal to possess a carrier frequency or tone, permitting the input signal to be of arbitrary form. In contrast to the embodiment of FIG. 1, however, the embodiment of FIG. 2 requires careful gain control and critical timing to produce a usable feedback signal. In addition, differential amplifier 17 must be capable of tracking the highest frequencies present in the output signal. Thus the embodiment of FIG. 2 has the advantage in applications where the input signal must be of general form, whereas the embodiment of FIG. 1 is more easily implemented in high frequency applications where the input signal either possesses a carrier or when a tone can be added.

Figure 3:
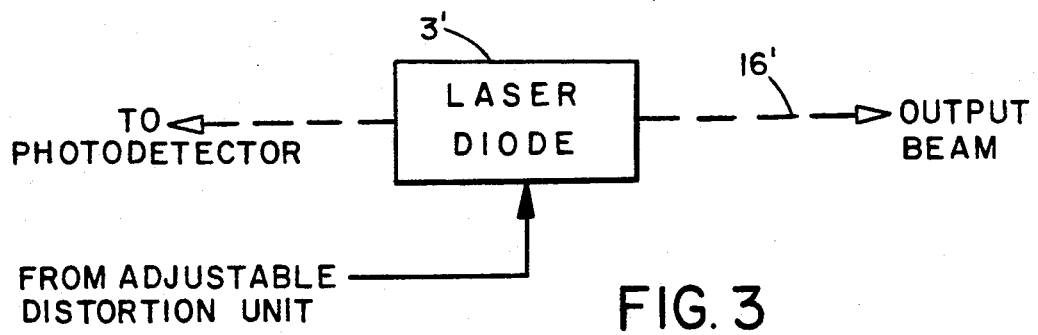
FIG. 3 illustrates an embodiment of the present invention incorporating as the light emitting device a laser diode having two facets.

FIG. 3 illustrates an embodiment of the present invention incorporating as the light emitting device a laser diode having two facets. Laser diode 3' of FIG. 3 may replace both light emitting device 3 and light splitting device 4 of FIGS. 1 and 2. In such an embodiment laser diode 3 has its input coupled to the output of adjustable distortion unit 2 and receives the predistorted input signal therefrom. Further a first output of laser diode 3' is optically coupled to the photodetector, and a second output produces the optical transmission signal as output beam 16 of FIGS. 1 and 2. Laser diode 3' responds to variations in the predistorted input signal by correspondingly varying the intensity of its output signals. The use of this variation is advantageous when the light beams emitted from the two facets of the laser diode are closely matched in their characteristics. If this is not the case the configurations of FIG. 1 and FIG. 2 are preferred.

It is common practice to package laser diodes with a monitor photodiode built into the enclosure so as to collect light from the rear facet of the laser diode. This built in monitor photodiode may be used according to FIG. 3 in those applications where the response of the photodiode is fast enough. Normally, such photodiodes are not designed to have a very fast response time since they are intended only to monitor average power levels. In high frequency applications a laser diode package may be constructed in a similar manner, substituting a higher speed photodetector.

Figure 4:
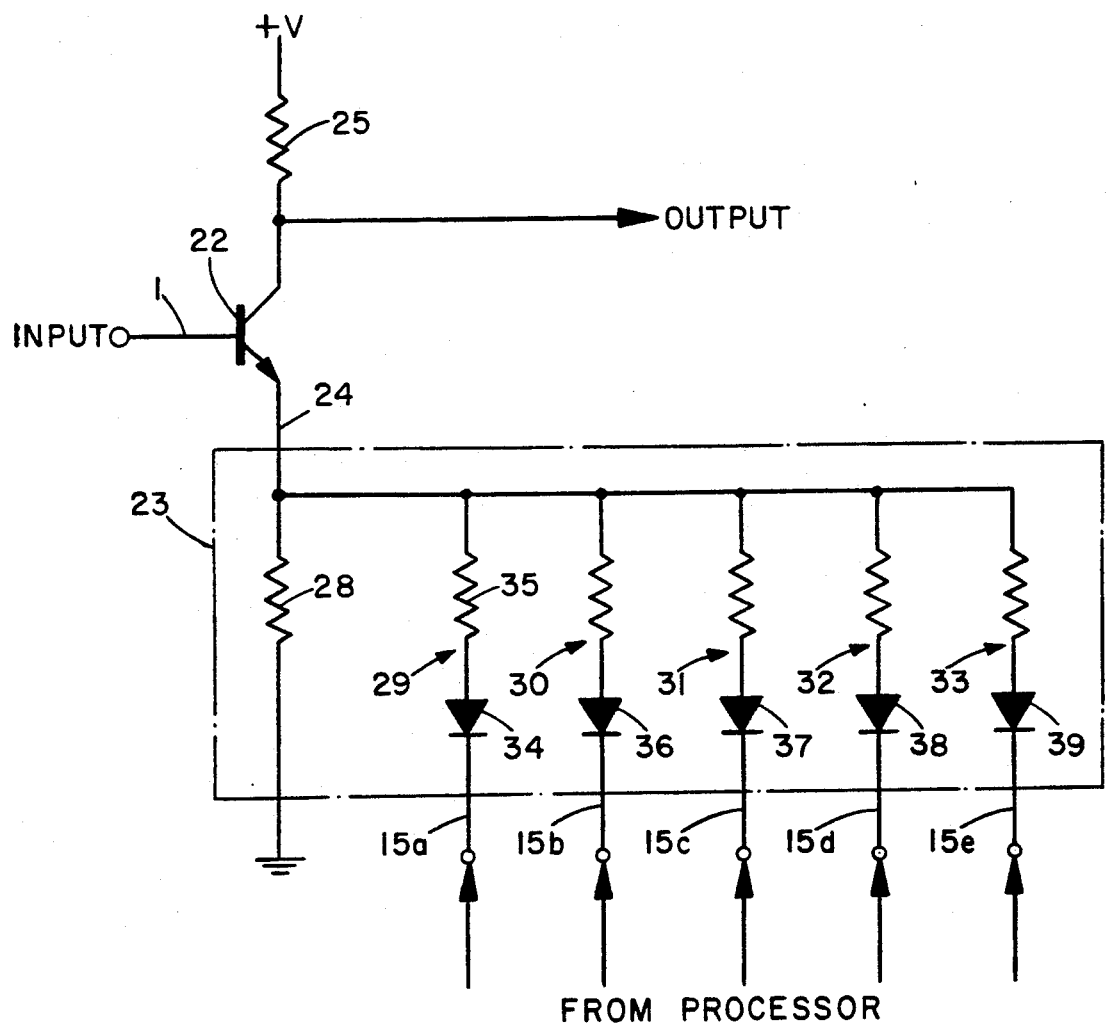
FIG. 4 illustrates an exemplary configuration of the adjustable distortion unit.

FIG. 4 illustrates an exemplary configuration of adjustable distortion unit 2 of FIGS. 1 and 2. This adjustable distortion unit comprises transistor 22 having its base coupled to input line 1, its collector coupled a first end of resistor 25, and its emitter coupled to emitter circuit 23. More specifically the emitter of transistor 22 is coupled via line 24 to a first end of resistor 28 and also a first end of a plurality of series resistor diode pairs 29–33. The second end of resistor 25 is coupled to a voltage source. The second end of resistor 28 is coupled to ground and the second end of each series resistor diode pair is coupled to a corresponding output of processor 14.

For any given input level on line 1 the gain of the amplifier is given approximately by the ratio of the 18 collector resistance 25 to the total resistance of the emitter circuit 23. Consider now the operation of emitter circuit 23, as the voltage on line 24 rises above the voltage on adjustable distortion unit input line 15a, switching diode 34 becomes forward biased, effectively adding the resistance of resistor 35 in parallel with the emitter resistance of resistor 29. The total resistance of the emitter circuit 23 thus decreases, thereby increasing the gain of the amplifier. Similarly, diodes 36, 37, 38 and 39 turn on as the voltage on line 24 passes the preselected voltage levels imposed on lines 15b, 15c, 15c and 15e. Since the diodes turn on gradually rather than abruptly, by choosing appropriate voltage levels the overall response can be made smooth and of the desired shape.

As diagramed in FIG. 4, the response of the predistortion unit is superlinear, with the gain increasing as the input signal level increases. The response may also be made sublinear over some range of input levels by reversing the polarities of some of the diodes.

In any embodiment of the present invention processor 14 must minimize the voltage level of its input by altering the plurality of voltage levels at its outputs. Processor 14 accomplishes this by executing an optimization algorithm. Any algorithm which can minimize a function of several variables under changing conditions may be used. The function to be minimized may be changing its form slowly with time and may also change abruptly under certain conditions (for example if one of the carriers in a multichannel system is suddenly turned off). It is therefore desirable to employ an algorithm which constantly searches the immediate neighborhood of the current minimum. The search must encompass only the immediate neighborhood of the current minimum since each step away from the minimum degrades the linearity of the system slightly. It is therefore necessary to carefully adjust the size of the search region. If the search region is too large the fluctuation in system linearity will be unacceptably large. If the search region is too small the system will not adapt rapidly to changing conditions.

During the initial adjustment of the predistortion unit the system may become trapped in a local minimum some distance from the true global minimum. In order to avoid this, an optimization technique that allows tunneling or hill-climbing for escaping from local minima (e.g. a simulated annealing optimization algorithm) may be used. Such a technique is described by Szu, in AIP Conference Proceedings 151, Neural Networks for Computing, Snowbird UT (1986). The Boltzman machine and the Cauchy machine are appropriate algorithms for the initial adjustment.

The previous descriptions of the exemplary embodiments are provided to enable any person skilled in the art to make or use the present invention. Numerous embodiments which are clearly within the scope and spirit of the invention will be readily apparent to those skilled in the art. Thus, the present invention is not intended to be limited other than by the appended claims.

I claim:

1. An optical transmitter having an adaptively maintained linear-to-output response, comprising;

adjustable distortion means for receiving an electrical input signal and a plurality of electrical control signals, the adjustable distortion means responsive to said control signals for distorting said input signal so as to provide an output predistorted signal;

light emitter means for receiving said predistorted signal and responsive thereto for generating an output optical transmission signal, said light emitter means having inherent nonlinearities in the generation of said optical transmission signal and an intensity of said optical transmission signal varying in response to variations of said predistorted signal; and feedback means comprising:

light splitter means for receiving said optical transmission signal and splitting off a portion of said optical transmission signal with a remainder portion of said optical transmission signal provided as an output optical signal;

conversion means having an input and output for receiving the split portion of said optical transmission signal and for generating a corresponding electrical feedback signal whose current variation corresponds to intensity variations of said optical transmission signal;

time averaging means for receiving said feedback signal and for generating at least one time averaged signal whose magnitude is indicative of the nonlinearities in the generation of said optical transmission signal; and processor means for receiving said at least one time averaged signal and for generating said plurality of control signals, each control signal of said plurality varying in voltage so as to minimize the magnitude of a corresponding one of said at least one time averaged signal.

2. The optical transmitter of claim 1 wherein said conversion means comprises:

light detecting means optically coupled to said light splitter means, for receiving said split portion of said optical transmission signal and for generating said electrical feedback signal whose current variations correspond to the intensity variations of said split portion of said optical transmission signal.

3. The optical transmitter of claim 1 wherein said conversion means further comprises light detecting means, optically coupled to said light emitter means, for receiving said optical transmission signal and for generating said electrical feedback signal whose electrical variation corresponds to intensity variation of said optical transmission signal.

4. The optical transmitter of claim 1 wherein the time averaging means comprises:

at least one narrow band filter means coupled to said conversion means, said narrow band filter means tuned to a harmonic frequency of said input signal different from that a harmonic frequency of any other narrow band filter means, said narrow band filter means for isolating a harmonic energy in said feedback signal in a frequency neighborhood around the harmonic to which it is tuned;

at least one averaging filter means having an input and an output, said averaging filter means coupled at its input to a corresponding said narrow band filter means, said averaging filter means for averaging over some period of time said harmonic energy provided by said corresponding narrow band filter means, and for providing at its respective output a time averaged harmonic energy; and wherein said at least one time averaged harmonic energy serves as said at least one time averaged signal provided to said processor means.

5. The optical transmitter of claim 1 wherein said input signal contains a plurality of carrier frequencies and wherein the time averaging means comprises:

at least one narrow band filter means coupled to said conversion means and tuned to a beat frequency resulting from the combination of said plurality of carrier frequencies within said input signal, said beat frequency being different from a beat frequency to which any other narrowband filter means is tuned, said narrow band filter means isolating a beat frequency energy in said feedback signal in a frequency neighborhood around the beat frequency to which it is tuned;

at least one averaging filter means having an input and an output, said averaging filter means coupled at its input to a corresponding said narrow band filter means, said averaging filter means averaging over some period of time said beat frequency provided by said corresponding narrow band filter means, and for providing at its respective output a time averaged beat frequency energy; and wherein said at least one time averaged beat frequency energy serves as said at least one time averaged signal provided to said processor means.

6. The optical transmitter of claim 1 wherein the time averaging means comprises:

delay means for receiving a input signal and for delaying said input signal by a fixed amount of time before providing said input signal at an output;

comparator means having a first input coupled to said delay means output for receiving said delayed input signal and a second input coupled to said conversion means for receiving so that said feedback signal, said comparator means generates an error signal whose magnitude is indicative of a discrepancy between said delayed input signal and said feedback signal; and averaging filter means coupled to said comparator means for, receiving said error signal, averaging over some period of time said error signal, and for providing a resultant time averaged error signal to said processor means, wherein said resultant time averaged error signal serves as said time averaged signal provided to said processor means.

7. The method of claim 6 wherein said electrical input signal contains two or more carrier frequencies and wherein said time averaged signal is a signal whose magnitude is indicative of the beat frequency content of said optical transmission signal.

8. A method for adaptively linearizing the response of an optical transmitter comprising the steps of:

generating a predistorted input signal by altering the magnitude of said input signal by passing said input signal through an amplifier whose gain varies with the magnitude of its input signal and providing a plurality of control signals to said amplifier so as to fix the input-to-output response of said amplifier, wherein said control signals vary according to an algorithm which causes the magnitude of said time averaged signal to be minimized;

generating an optical transmission signal whose intensity varies in response to variations in said predistorted input signal, the generation of said optical transmission having inherent nonlinearities;

generating at least one time averaged signal whose magnitude is indicative of one or more of said nonlinearities in the generation of said optical transmission signal; and altering the degree and the kind of distortion of said input signal in response to said time averaged signal so as to minimize the magnitude of said time averaged signal.

9. A method for adaptively linearizing the response of an optical transmitter comprising the steps of:

generating a predistorted input signal by distorting an input signal;

generating an optical transmission signal whose intensity varies in response to variations in said predistorted input signal, the generation of said optical transmission having inherent nonlinearities;

generating at least one time averaged signal whose magnitude is indicative of one or more of said nonlinearities in the generation of said optical transmission signal; and altering the degree and the kind of distortion of said input signal in response to said time averaged signal by continuously measuring said time averaged signal and correspondingly altering the degree and kind of distortion according to an algorithm so as to minimize the magnitude of said time averaged signal.

* * * * *